(12) United States Patent
Joulin

(10) Patent No.: US 6,318,778 B1
(45) Date of Patent: Nov. 20, 2001

(54) SUCTION PICK-UP HEAD

(76) Inventor: Michel Joulin, 11 rue de Villemartin, 91150 Morigny (FR)

(*) Notice: Subject to any disclaimer, the term of this patent is extended or adjusted under 35 U.S.C. 154(b) by 0 days.

(21) Appl. No.: 09/565,381

(22) Filed: May 5, 2000

(30) Foreign Application Priority Data

May 7, 1999 (FR) .................................................. 99 05851

(51) Int. Cl.[7] .................................................... B66C 1/02
(52) U.S. Cl. ............................................ 294/64.1; 294/65
(58) Field of Search ................................ 294/64.1, 64.2, 294/64.3, 65; 901/40; 414/627, 737, 752.1; 269/21

(56) References Cited

U.S. PATENT DOCUMENTS

| 2,572,640 | * | 10/1951 | Lovegrove | 294/64.1 |
| 3,406,938 | * | 10/1968 | Muir, Jr. | 294/65 |
| 3,523,707 | * | 8/1970 | Roth | 294/65 |
| 3,591,228 | * | 7/1971 | Webb | 294/65 |
| 4,185,814 | * | 1/1980 | Buchmann et al. | 294/64.1 |
| 4,674,785 |   | 6/1987 | Riesenberg . | |
| 4,703,966 | * | 11/1987 | Lewecke et al. | 294/65 |
| 4,793,657 | * | 12/1988 | Mense | 294/65 |
| 5,035,568 |   | 7/1991 | Joulin . | |
| 5,297,830 | * | 3/1994 | Hoke | 294/65 |

* cited by examiner

Primary Examiner—Dean J. Kramer
(74) Attorney, Agent, or Firm—Birch, Stewart, Kolasch & Birch, LLP

(57) ABSTRACT

A suction pick-up head is disclosed having a soleplate supporting rows of compartments and connection devices for putting the compartments into communication with a suction device. The connection device includes partitioning ensuring that at least a portion of the compartments are connected in series or parallel relative to the suction device.

3 Claims, 1 Drawing Sheet

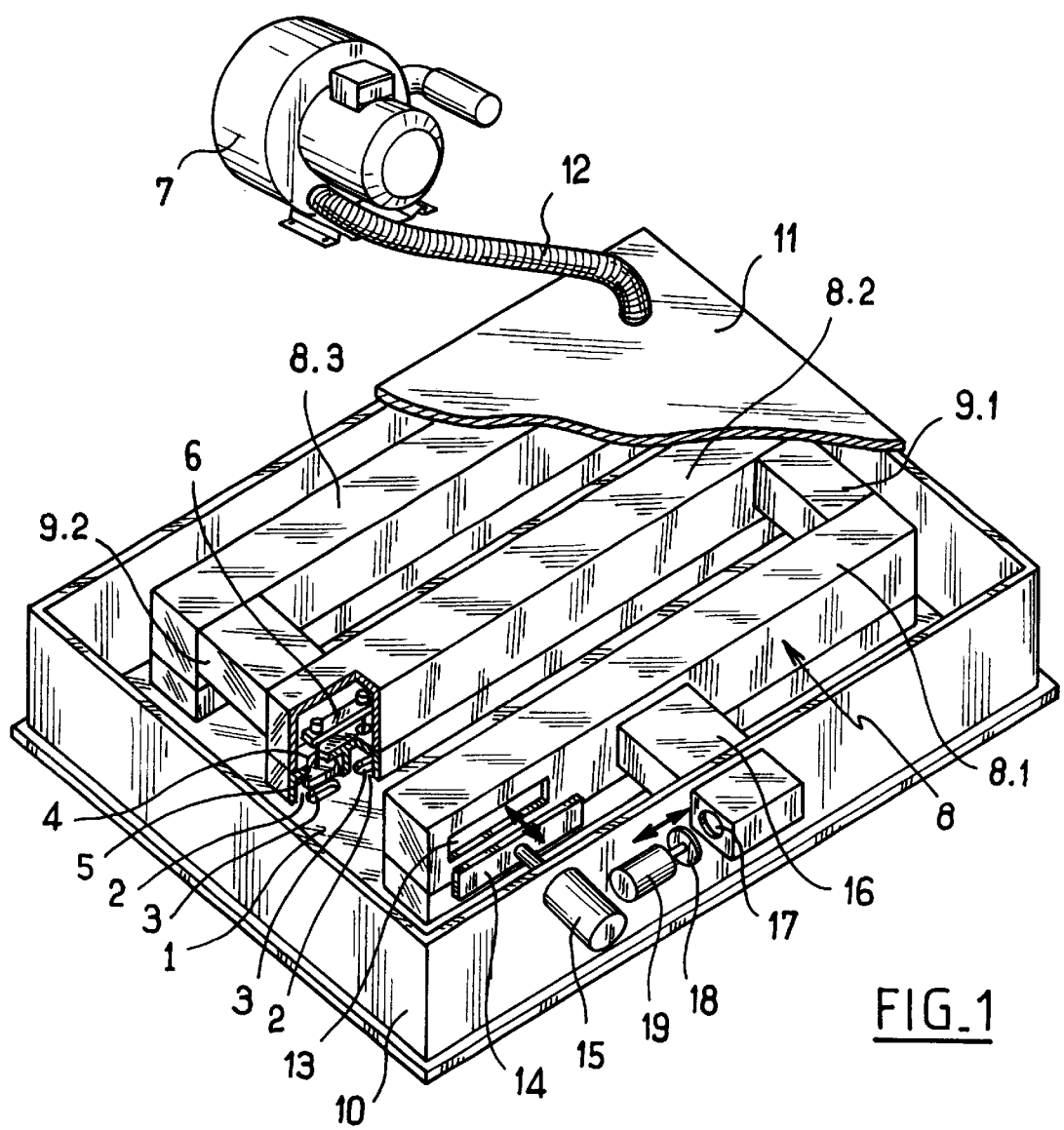
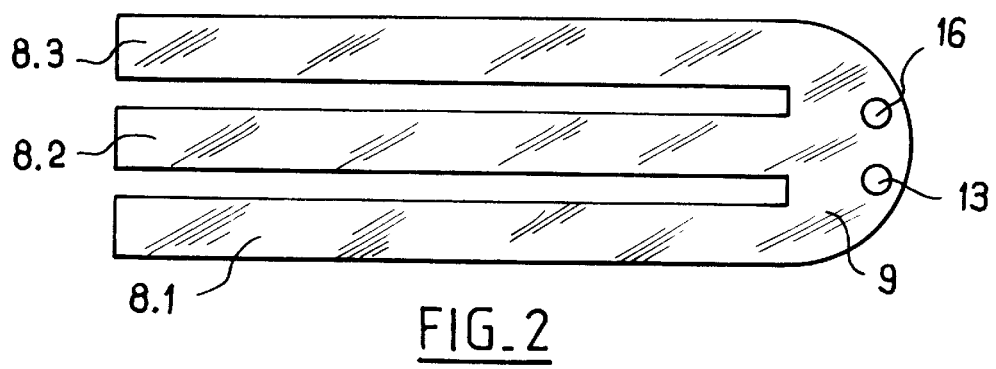

SUCTION PICK-UP HEAD

The present invention relates to a pick-up head operating by suction.

BACKGROUND OF THE INVENTION

Systems are known for picking up and carrying material such as planks, sheet metal plates, or similar materials. Such systems comprise a structure mounted to move along a frame and including a pick-up head that operates by suction.

In known systems, the suction pick-up head comprises a box connected to a suction device, generally a turbine, carried by the frame of the system. The box of the pick-up head has a soleplate supporting rows of independent compartments each having a bottom orifice opening out in the bottom face of the soleplate and a top orifice fitted with a moving closure member mounted in the compartment to enable the top orifice to be closed when the bottom orifice is not obstructed by an article to be picked up and the suction is sufficient to suck up the valve member. When the bottom orifice of the compartment is obstructed by an object to be picked up, the valve member remains open and the suction inside the box then serves to press the object against the soleplate of the pick-up head. To provide better sealing of the contact between the soleplate and the article to be picked up, it is preferable to provide a sealing material on the underside of the soleplate, such as a foam, whose characteristics are adapted to the surface state of the articles to be picked up.

Such a structure enables objects to be handled that have a variety of dimensions even when said objects occupy only a portion of the surface of the soleplate of the pick-up head. When it is desired to be able to pick up a multiplicity of articles of small dimensions or articles of various outlines, it is necessary to subdivide the surface of the soleplate into a very large number of compartments that are likewise of small dimensions so as to ensure that each article can fully obstruct the bottom orifice of a number of compartments that is large enough to enable the article to be picked up.

Furthermore, in order to be able to maintain sufficient suction in the compartments in register with articles to be picked up, it is necessary for all of the moving closure members of the compartments which are not in register with an article to be picked up to close very quickly when picking up articles. Raising each closure member so as to press it against the top orifice of the corresponding compartment requires a certain flow rate to pass through the top orifice of the compartment. When the closure members of a large number of compartments need to be raised because of the small surface area of the articles to be picked up, it is therefore necessary to provide a large suction flow rate through the box. However, to provide sufficient lifting force for the articles to be handled, it is necessary to cause the suction turbines to operate in a mode that provides a large amount of suction but at a small flow rate that does not make it possible simultaneously to raise a large number of closure members.

To mitigate that drawback, pick-up heads are known that have a buffer volume connected to the box containing the pick-up compartments, with a shutter being located to separate the buffer volume from the box until a certain level of suction is obtained in the buffer volume. Opening the shutter then allows suction at a rate that is proportional to the size of the buffer volume. To provide a large flow rate, it is therefore necessary to provide buffer volumes of large dimensions. This implies not only that the pick-up head needs to be large in size, but also that it needs to be heavy, both of which needs constitute major drawbacks for a moving structure. In addition, such suction through all of those compartments which are not in register with articles to be picked up causes a large amount of dust to be sucked up, which dust is subsequently deposited inside the box, where it piles up and impedes proper operation of the pick-up head. In addition, sudden decompression of both the box and the buffer volume when the articles are put down gives rise to a loud noise which degrades working conditions for the operators of the pick-up system.

OBJECTS AND SUMMARY OF THE INVENTION

In order to remedy those drawbacks, the invention proposes a suction pick-up head comprising a soleplate supporting rows of compartments each comprising a bottom orifice opening out through the bottom face of the soleplate and a top orifice fitted with a moving closure member, and connection means for putting the top orifices of the compartments into communication with a suction device, in which the connection means comprise partitioning for putting at least a portion of the top orifices of the compartments into series relative to the suction device.

Thus, instead of causing all of the closure members of those compartments which are not in register with an article to be picked up to move simultaneously, provision is made to ensure that these compartments close in cascade, such that the instantaneous flow rate required is considerably reduced, thereby making it possible to reduce or even eliminate the buffer volume that has been necessary in prior devices. In addition, air flow inside the pick-up head is channeled by the partitioning, so that dust sucked in during pick-up is progressively entrained to the turbine from which it can then be ejected.

In an advantageous version of the invention, the partitioning comprises a manifold having branches disposed vertically in register with rows of compartments, the branches of the manifold being interconnected via connections in series or in parallel. Thus, in each branch of the manifold, the compartments are connected in series and the pick-up head is easily adapted to particular operating conditions by making corresponding series or parallel connections between the various branches of the manifold.

According to another advantageous feature of the invention, the pick-up head has walls forming a leakproof box around the manifold, the suction device is connected to the box, the manifold has a suction orifice opening out to the inside of the box and an exhaust orifice opening out to the outside of the box, and respective shutters are associated with the suction orifice and the exhaust orifice. Thus, the volume lying between the manifold and the walls of the box serves as a buffer volume whereby faster operation of the pick-up head is obtained without increasing the size thereof.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other characteristics and advantages of the invention will appear on reading the following description of two particular and non-limiting embodiments of the invention, given with reference to the accompanying figures, in which:

FIG. 1 is a partially cutaway diagrammatic perspective view of a pick-up head of the invention; and FIG. 2 is a diagrammatic plan view of a manifold in a second embodiment of the invention.

MORE DETAILED DESCRIPTION

With reference to FIG. 1, the pick-up head comprises, in conventional manner, a soleplate 1 supporting rows of compartments 2, of which only two can be seen in the cutaway view of the figure. Each compartment 2 has a bottom orifice 3 opening out through the bottom face of the soleplate, and a top orifice 4 fitted with a moving closure member 5. In the embodiment shown, the closure member 5 is a valve member fixed to a rod passing through the top orifice 4 and associated with a guide member 6. In the embodiment shown, the pick-up head has only three rows of compartments 2, although in practice this number is not limiting.

In accordance with the invention, the pick-up head has partitioning enabling at least some of the top orifices 4 of the compartment 2 to be connected in series relative to the suction device 7. In the embodiment shown, the partitioning comprises a manifold given overall reference 8 and having three branches respectively referenced 8.1, 8.2, and 8.3 and disposed in register over respective rows of compartments 2. In the embodiment of FIG. 1, the branches of the manifold 8 are connected in series via connection ducts 9.1 and 9.2.

The pick-up head also has a side wall 10 fixed in leakproof manner to the soleplate 1 and surrounding the manifold 8, and a cover 11 fixed in leakproof manner to the side wall 10 so as to form a leakproof box around the manifold 8. The suction turbine 7 is connected by a flexible hose 12 to the inside of the box made in this way.

In the vicinity of one of its ends, the manifold has a suction orifice 13 opening out into the inside of the box, and in register therewith there is mounted a shutter 14 fixed to the end of the drive rod of an actuator 15 mounted on the side wall 10 of the box. An exhaust duct 16 is also connected to the manifold 8 adjacent to the suction orifice 13 and beyond it relative to the end of the manifold which is close to the suction orifice 13. The exhaust duct 16 has a lateral exhaust orifice 17 outside the box. A shutter 18 is carried by a drive actuator 19 fixed to the side wall 10 of the box so as to extend in register with the exhaust orifice 17.

The device of the invention operates as follows: with the shutters 14 and 18 pressed against the corresponding orifices, the turbine 7 is switched on and progressively establishes suction inside the volume extending between the manifold 8 and the side wall 10 of the box. Once the required level of suction has been reached, the shutter 14 is moved so as to open the suction orifice 13, and the suction propagates into the manifold 8, whereby those compartments 2 which are not in register with an article to be picked up are caused to close in succession, firstly in the branch 8.1 of the manifold, then in the branch 8.2, and finally in the branch 8.3. It will be observed that the speed at which the suction propagates inside the manifold 8 depends on the air flow rate through the suction opening 13. In practice, given the small section of the manifold 8, the suction is found to propagate very quickly inside the manifold 8 even when a buffer volume is not used, i.e. even if the suction orifice 13 is opened as soon as the turbine 8 is switched on. The use of the buffer volume thus makes it possible to increase the speed at which the suction propagates, or to increase the number of compartments for a given suction turbine.

After the articles picked up by the pick-up head have been handled, they are put down by closing the suction orifice 13 by means of the shutter 14, and by opening the exhaust orifice 17. Air at ambient pressure admitted through the exhaust orifice 17 propagates along the manifold 8 causing the picked-up objects to be put down, and also re-opening the top orifices of those compartments that were not in register with an object. In this context, it will be observed that because of the particular disposition of the exhaust duct relative to the suction orifice, any residual suction resulting from leakage at the shutter 14 is compensated by air penetrating into the exhaust duct 16, such that no suction is maintained inside the manifold 8.

With reference to FIG. 2, the three branches 8.1, 8.2, and 8.3 of the manifold in the second embodiment shown are connected in parallel via a connection duct 9 associated with the same ends of the branches 8.1, 8.2, and 8.3, and including a suction orifice 13 and an exhaust duct 16. This disposition makes, it possible to apply suction simultaneously to each of the three branches of the manifold, thereby accelerating operation of the valve members in the compartments. Nevertheless, this relies on the flow rate through the suction orifice 13 being sufficient to ensure that all three branches can be put under suction simultaneously.

Naturally, the invention is not limited to the embodiments described and variants can be applied thereto without going beyond the ambit of the invention as defined by the claims.

In particular, although the pick-up head of the invention is shown associated with closure members in the form of valve members, the invention applies to a pick-up head regardless of the type of closure member used.

Although the invention has been shown with a manifold that is located above the rows of compartments and that is fixed to the top walls of the compartments, it is possible to provide a manifold that surrounds the rows of compartments and that is fixed to the soleplate 1.

Although the invention is shown with a manifold of constant section whose branches are interconnected in series or in parallel, it is possible to provide a manifold of varying section and to combine series connections with parallel connections between the various branches as a function of the conditions under which the pick-up head is to be used, in particular as a function of the kind and shape of object to be picked up, and also as a function of the operating characteristics of the associated suction device.

Instead of being implemented in the form of a manifold as shown in FIG. 1, the pick-up head of the invention can be implemented in the form of the box that is partitioned by walls that extend between the soleplate and the cover, these walls defining zones in which the compartments are disposed in series, the various zones being interconnected in series or in parallel via shutters appropriately located inside the box or via ducts outside the box, with openings that are closable by flaps also being provided inside the cover of the box. In one embodiment, this type of partition also serves the function of stiffening the box. In which case, there is no need to provide the stiffening elements that are usually used, thereby enabling the size and the weight of the box to be minimized.

Cleaning of the pick-up head of the invention can also be improved by making provision to connect the outlet from the turbine 7 to the exhaust duct. This disposition also makes it possible to put transported articles down more quickly.

It is also possible to provide for the various branches of the manifolds to be connected to suction or to exhaust separately so as to pick up or put down only some of a series of objects. Under such circumstances, it is also possible to provide for suction to be applied in staggered manner to the various branches of the manifold.

As described above, with a small number of compartments, the flow rate of the turbine can be sufficient to drive the valve members and to establish suction inside the manifold. Under such circumstances, the turbine can be connected directly to the manifold with the side wall and the cover of the pick-up head being omitted. The weight of the pick-up head is thus further decreased and its mobility improved.

In the embodiment described, the branches of the manifold are closed at their ends, with the connections between the branches being provided by connection ducts 9. When it is desired to connect the branches of the manifold in parallel only, without providing a buffer volume, it suffices for each branch of the manifold to be open at one end or at both ends and to make the exhaust duct open out into one of the walls of the box.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A suction pick-up head comprising a soleplate supporting rows of compartments each comprising a bottom orifice opening out through the bottom face of the soleplate and a top orifice fitted with a moving closure member, a manifold having branches extending over rows of compartments and being connected with the top orifice of the corresponding compartments, the branches of the manifold being interconnected via connections in series or in parallel, the pick-up head having walls forming around the manifold a leakproof box connected to a suction device, the manifold having a suction orifice opening to the inside of the box and an exhaust orifice opening out to the outside of the box, and respective shutters being associated with the suction orifice and the exhaust orifice.

2. The pick-up head according to claim 1, wherein the suction orifice is adjacent to one end of the manifold and the exhaust orifice is adjacent to the suction orifice, and beyond it relative to the end of the manifold.

3. The pick-up head according to claim 1, wherein the shutters are controlled by respective actuators disposed on the side of the box.

\* \* \* \* \*